US008428840B2

(12) United States Patent
O'Dea et al.

(10) Patent No.: US 8,428,840 B2
(45) Date of Patent: Apr. 23, 2013

(54) METHOD FOR CONTROLLING TORQUE AT ONE OR MORE WHEELS OF A VEHICLE

(75) Inventors: Kevin A. O'Dea, Ann Arbor, MI (US); John F. Larsen, Campbellcroft, CA (US); Edmund F. Gaffney, III, White Lake, MI (US); James Heath Holbrook, Fenton, MI (US); Benjamin A. C. Beacock, Courtice, CA (US); Sisira D. Adikari, Aurora, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 12/915,432

(22) Filed: Oct. 29, 2010

(65) Prior Publication Data

US 2012/0109483 A1 May 3, 2012

(51) Int. Cl.
*G06F 17/00* (2006.01)

(52) U.S. Cl.
USPC .................................. 701/71; 701/70; 701/90

(58) Field of Classification Search .............. 701/69–71, 701/78–79, 84, 87, 90
See application file for complete search history.

(56) References Cited

U.S. PATENT DOCUMENTS

| | | | | |
|---|---|---|---|---|
| 4,783,126 | A * | 11/1988 | Arikawa | 303/148 |
| 5,789,882 | A * | 8/1998 | Ibaraki et al. | 318/148 |
| 6,325,470 | B1 * | 12/2001 | Schneider | 303/152 |

* cited by examiner

*Primary Examiner* — Yonel Beaulieu
(74) *Attorney, Agent, or Firm* — Lionel D. Anderson; Reising Ethington P.C.

(57) ABSTRACT

An exemplary method for controlling torque at one or more wheels of a vehicle, including controlling both positive torque (acceleration) and negative torque (braking) with a single torque command. According to one embodiment, the method interprets the acceleration and braking intent of the driver, takes into consideration certain special conditions (e.g., vehicle dynamic conditions like wheel slip, over- and under-steer, etc.), and generates one or more individual torque commands that are sent to individual wheels or corners of the vehicle. The individual torque commands may address certain chassis and powertrain functions like acceleration and braking, and may provide full-feature torque control (i.e., acceleration, braking, vehicle dynamics, etc.) on an individual wheel basis. It is also possible for the method to be used in a system where a number of the common chassis, powertrain and/or vehicle dynamic modules have been integrated into a single torque control module or the like.

15 Claims, 2 Drawing Sheets

METHOD FOR CONTROLLING TORQUE AT ONE OR MORE WHEELS OF A VEHICLE

TECHNICAL FIELD

The present invention generally relates to vehicles and, more particularly, to methods and systems for electronically controlling torque—including both positive torque (acceleration) and negative torque (braking)—at one or more wheels of a vehicle.

BACKGROUND

In a conventional vehicle, actuation of the accelerator and brake pedals generally dictates the acceleration and deceleration of the vehicle, respectively. The mechanisms that control the acceleration and deceleration of the vehicle can be somewhat independent of each other, as a throttle control system typically addresses issues concerning acceleration and a brake control system typically addresses issues regarding deceleration. That is not to say that such systems never collaborate or communicate with one another; only that, in most vehicles, separate command signals are generated for controlling the acceleration and deceleration of the vehicle.

SUMMARY

According to one embodiment, there is provided a method for controlling torque at one or more wheels of a vehicle. The method may comprise the steps of: (a) receiving an accelerator signal from an accelerator sensor and receiving a brake signal from a brake sensor; (b) using the accelerator signal and the brake signal to determine an integrated torque request, the integrated torque request takes into account both an accelerating intent and a braking intent of the driver; (c) using the integrated torque request to determine one or more individual torque command(s), each of the individual torque command(s) takes into account both the accelerating intent and the braking intent of the driver; and (d) controlling one or more wheel(s) of the vehicle with the individual torque command(s), wherein each of the individual torque command(s) can cause the controlled wheel to accelerate, to brake, or to maintain a constant speed.

According to another embodiment, there is provided a method for controlling torque at one or more wheels of a vehicle. The method may comprise the steps of: (a) determining an integrated torque request, the integrated torque request takes into account both an accelerating intent and a braking intent of the driver; (b) using the integrated torque request to determine a plurality of individual torque commands, each of the individual torque commands corresponds to a separate wheel of the vehicle and is specifically intended for that separate wheel; (c) sending each of the plurality of individual torque commands from a torque control unit to a separate wheel of the vehicle; and (d) separately controlling each of the wheels of the vehicle with an individual torque command.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

Figure 1:
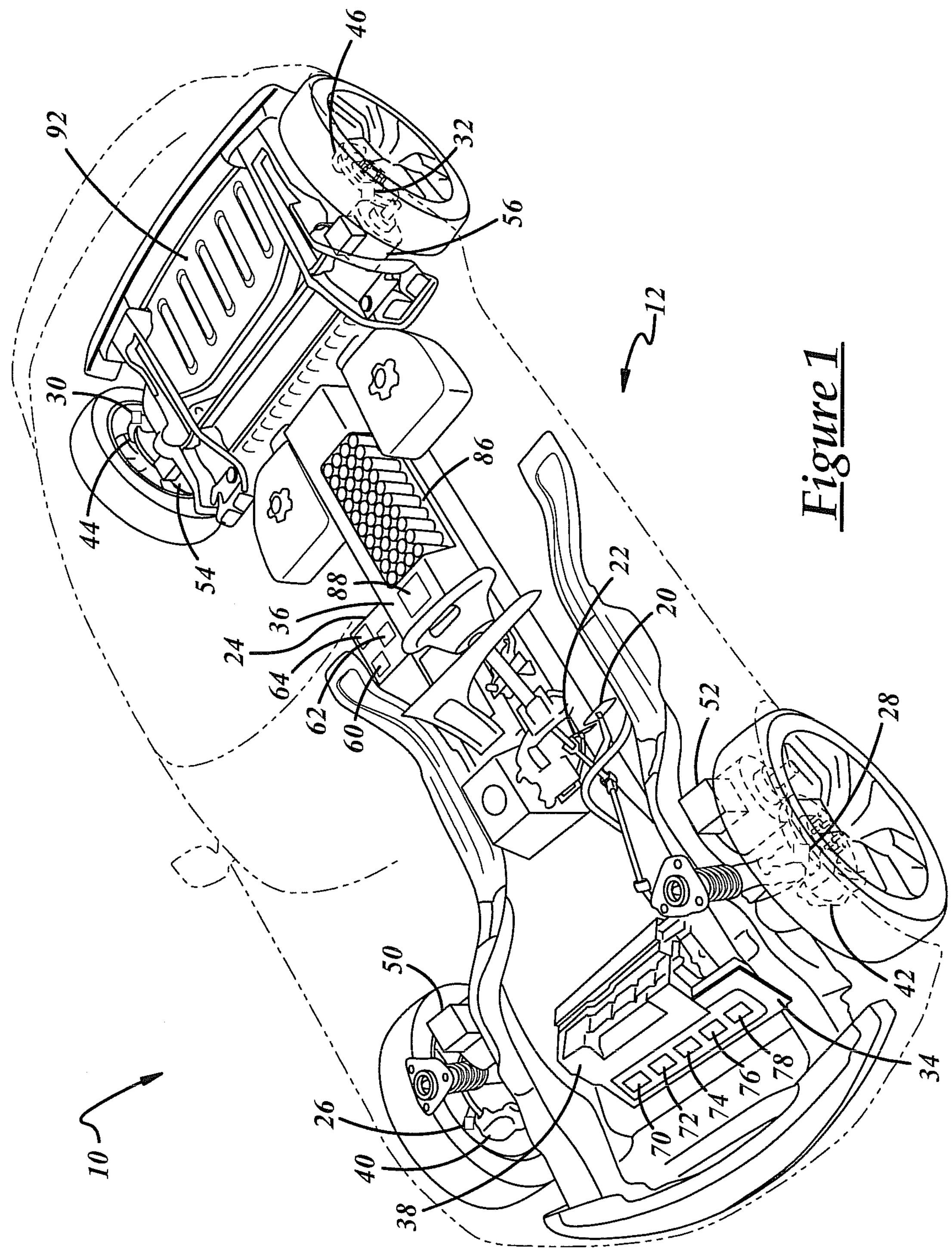
FIG. 1 is a perspective view of an exemplary vehicle that includes a torque control system.

With reference to FIG. 1, there is shown portions of an exemplary vehicle 10 having a torque control system 12 that may be used to control both positive torque (acceleration) and negative torque (braking) at one or more wheels of the vehicle. According to an exemplary embodiment, torque control system 12 separately generates an individual torque command for each vehicle wheel, where the individual torque command takes into account both the accelerating and braking intent of the driver. Thus, torque control system 12 may control both the acceleration and braking at a particular wheel with a single command signal that is sent to a motor unit and/or a brake unit located at the corner, and avoids having to manage the acceleration and braking of the vehicle with separate and independent command signals. Additional attributes and characteristics of this system and the corresponding method are described below in greater detail.

It should be appreciated that FIG. 1 is only a schematic representation of one potential vehicle and torque control system, and that the method described herein could be used with any number of different vehicles and systems and is not limited to the exemplary ones shown here. For example the method described below can be used with a wide variety of vehicles, including a hybrid electric vehicle (HEV) like the one shown in FIG. 1, a plug-in hybrid electric vehicle (PHEV), an extended range electric vehicle (EREV), or any other battery electric vehicle (BEV) that uses battery power for vehicle propulsion, to cite a few possibilities. According to this particular embodiment, torque control system 12 generally includes a brake sensor 20, an accelerator sensor 22, a vehicle dynamics sensor unit 24, vehicle speed sensors 26-32, a torque control unit 34, a battery 36, an engine 38, brake units 40-46, and motor units 50-56.

Any number of different sensors, components, devices, modules, subsystems, systems, etc. may provide torque control system 12 with information or input that could be used with the present method. These include, for example, the exemplary sensors shown in FIG. 1, as well as others that are known in the art but are not shown here. It should be appreciated that brake sensor 20, accelerator sensor 22, the sensors of vehicle dynamics sensor unit 24, wheel speed sensors 26-32, as well as any other sensor located in and/or used by torque control system 12 may be embodied in hardware, software, firmware or some combination thereof These sensors may directly sense or evaluate the conditions for which they are provided, or they may indirectly evaluate such conditions based on information provided by other sensors, components, devices, modules, subsystems, systems, etc. Furthermore, these sensors may be directly coupled to torque control unit 34, indirectly coupled via other electronic devices, coupled over a vehicle communications bus, network, etc., or coupled according to some other arrangement known in the art. In addition, these sensors may be integrated within a vehicle component, device, module, subsystem, system, etc. (e.g., sensors provided within an engine control module, an energy management system, etc.), they may be stand-alone components (as schematically shown in FIG. 1), or they may be provided according to some other arrangement. It is possible for any one of the sensor signals described below to be provided by an engine control module, a transmission control module, a brake control module, a traction control module, or some other component, device, module, subsystem, system, etc. in vehicle 10 instead of being directly provided by an actual sensor element. In some instances, multiple sensors might be employed to sense a single parameter (e.g., as a means for providing signal redundancy for the purpose of improving control and/or diagnostic robustness). These are only some of the possibilities, as any type of sensor or sensor arrangement known in the art could also be used.

Brake sensor 20 provides torque control system 12 with a brake signal that is generally representative of the position, movement, exerted force, and/or state of the brake pedal. Thus, the brake signal is generally representative of the braking intent of the driver. Any number of different types of brake sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake sensor 20 may be integrated with a brake pedal simulator or emulator that conveys the expected mechanical feel of the brake pedal to the driver, as well as provides a brake signal.

Accelerator sensor 22 provides torque control system 12 with an accelerator signal that is generally representative of the position, movement, exerted force, and/or state of the accelerator pedal. Thus, the accelerator signal is generally representative of the accelerating intent of the driver. Skilled artisans will appreciate that a number of different types of accelerator sensors could be used; these include non-contact-type sensors (e.g., optical sensors, electro-magnetic sensors, etc.), contact-type sensors (e.g., potentiometers, contact switches, etc.), as well as those that measure the force that the drive exerts against the accelerator pedal, to name a few. In an exemplary embodiment, accelerator sensor 22 includes a non-contact-type sensor with a Hall-Effect element that is operably coupled to the accelerator pedal so that it can determine the current position, rotational velocity and/or state of the accelerator pedal. In a drive-by-wire application, accelerator sensor 22 may be integrated with an accelerator pedal simulator or emulator that conveys the expected mechanical feel of the accelerator pedal to the driver, as well as provides an accelerator signal.

Vehicle dynamics sensor unit 24 may include any combination of sensors or sensing elements that detect or measure vehicle dynamics, and may be packaged separately or in a single unit. According to one exemplary embodiment, vehicle dynamics sensor unit 24 is an integrated sensor unit that includes a yaw rate sensor 60, a lateral acceleration sensor 62, and a longitudinal acceleration sensor 64 all packaged together, and is mounted inside of the vehicle cabin. One potential location for mounting vehicle dynamics sensor unit 24 is under the passenger seat, although it could be mounted elsewhere instead.

Yaw rate sensor 60 provides torque control system 12 with a yaw rate signal that is generally representative of the angular velocity or speed of the vehicle around a vertical axis; i.e., the vehicle yaw rate. Yaw rate sensor 60 may be a standalone sensor, as opposed to being integrated within the same housing as acceleration sensors 62 and 64, and it may provide devices other than torque control unit 34 with information. For example, an antilock brake system (ABS) and a vehicle electronic stability control (ESC) system may use information from yaw rate sensor 60. Some exemplary technologies that may be used with yaw rate sensor 60 include piezoelectric-type sensors, micromechanical-type sensors and gyroscopes, all of which are known to those skilled in the art. Any type of suitable yaw rate sensor may be used here, including those that directly sense or measure the vehicle's yaw rate, along with those that calculate or deduce the yaw rate from other data, measurements, readings, etc.

Lateral acceleration sensor 62 provides torque control system 12 with a lateral acceleration signal that is generally representative of the lateral acceleration of the vehicle. Lateral acceleration is sometimes noticeable as a centrifugal force moving a vehicle to the outside of a curve when a vehicle is cornering. In one embodiment, lateral acceleration sensor 62 includes a lateral accelerometer that is co-located in the same housing as yaw rate sensor 60 or is integrated together as one unit. Some examples of suitable acceleration sensor types include microelectromechanical system (MEMS) type sensors and tuning fork-type sensors, although any type of acceleration sensor may be used. Depending on the particular needs of the system, lateral acceleration sensor 62 may be a single- or multi-axis sensor, may detect acceleration and/or deceleration, may detect the magnitude and/or the direction of the acceleration as a vector quantity, may sense or measure acceleration directly, or may calculate or deduce acceleration from other readings like vehicle speed readings, to cite a few possibilities.

Longitudinal acceleration sensor 64 provides torque control system 12 with a longitudinal acceleration signal that is generally representative of the longitudinal acceleration of the vehicle. Longitudinal acceleration refers to the component of vehicle acceleration that is parallel to its longitudinal axis. In one embodiment, longitudinal acceleration sensor 64 includes a longitudinal accelerometer that is co-located in the same housing as yaw rate sensor 60 or is integrated together as one unit. Some examples of suitable acceleration sensor types include microelectromechanical system (MEMS) type sensors and tuning fork-type sensors, although any type of acceleration sensor may be used. Depending on the particular needs of the system, longitudinal acceleration sensor 64 may be single- or multi-axis sensors, may detect acceleration and/or deceleration, may detect the magnitude and/or the direction of the acceleration as a vector quantity, may sense or measure acceleration directly, or may calculate or deduce acceleration from other readings, to cite a few possibilities. It is also possible for the longitudinal acceleration of the vehicle to be determined from the readings provided by vehicle speed sensors 26-32.

Vehicle speed sensors 26-32 provide torque control system 12 with speed signals that are indicative of the rotational speed or velocity of the wheels, and hence the overall velocity of the vehicle. A variety of different speed sensors and sensing techniques may be used, including those that use rotational wheel speed, ground speed, accelerator pedal position, clutch pedal position, gear shifter selection, vehicle acceleration, engine speed, engine torque, and throttle valve position, to name a few. In one embodiment, individual wheel speed sensors 26-32 are coupled to each of the vehicle's four wheels and separately report the rotational velocity of the four wheels. Skilled artisans will appreciate that these sensors may operate according to optical, electromagnetic or other technologies, and that vehicle speed sensors 26-32 are not limited to any particular speed sensor type. In another embodiment, speed sensors could be coupled to certain parts of the vehicle, such as an output shaft of the transmission or behind the speedometer, and produce speed signals from these measurements. It is also possible to derive or calculate speed signals from acceleration signals, such as those mentioned above (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). It is possible for the speed signals to be provided to torque control system 12 by some other module, subsystem, system, etc., like an engine control module (ECM).

Torque control unit 34 may include any combination of electronic processing devices, memory devices, input/output (I/O) devices, and/or other known components, and may perform various control and/or communication related functions. In an exemplary embodiment, torque control unit 34 includes an electronic memory device 70, an electronic processing device 72, an antilock braking system (ABS) unit 74, an electronic stability control (ESC) unit 76, and a traction control system (TCS) unit 78. Depending on the particular embodiment, torque control unit 34 may be a single standalone unit or module, it may be incorporated or included within one or more other electronic modules or systems, it may be part of a larger network or system (e.g., an energy management system or stability control system), or it could embody a combination of these arrangements, to name a few possibilities. It is not necessary for units 74-78 to be integrated or included within a single torque control unit 34, as this arrangement is only shown in FIG. 1 for purposes of illustration. Many different types and arrangements of torque control unit 34 may be used with the method described below, including ones where units 74-78 are not maintained within the torque control unit. Some examples of potential implementations of torque control unit 34 may include a vehicle control integrated module (VCIM), a traction power inverter module (TPIM), a battery power inverter module (BPIM), a motion and energy control (MEC) module, a hybrid control module, or some other module that is used to determine or manage a desired hybrid operating mode. The present method is not limited to any particular embodiment.

Electronic memory device 70 may include any type of suitable electronic memory means and may store a variety of data, information and/or electronic instructions. This includes, for example, sensed vehicle conditions (e.g., those provided by sensors 20-32), look-up tables and other data structures, algorithms (e.g., electronic instructions used to implement the method described below), vehicle component characteristics and background information (e.g., operational settings, etc. for the different vehicle components), etc. The method described below—as well as any combination of electronic instructions and information needed to perform such an algorithm—may be stored or otherwise maintained in memory device 70.

Electronic processing device 72 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 72 is not limited to any one type of component or device. Torque control unit 34 may be electronically connected to other vehicle devices, modules, systems, etc. via a suitable connection and can interact with them as required. These are, of course, only some of the possible arrangements, functions and capabilities of torque control unit 34, as others are certainly possible.

Antilock braking system (ABS) unit 74 may work with torque control unit 34 when it detects certain wheel slip environments. In one embodiment, ABS unit 74 monitors the deceleration rates of the various vehicle wheels and, if a wheel slip condition is detected, then the ABS unit momentarily reduces the braking force to the wheel or corner that is experiencing the wheel slip. Once the rate of deceleration for the affected wheel comes back in line with the others (e.g., by regaining traction), normal braking force can be restored such that normal braking continues. Skilled artisans should appreciate that there are a variety of different ABS systems that can be used by the present method, including ones having different types and numbers of channels and/or sensors. Although the ABS unit 74 is schematically shown in FIG. 1 as being part of torque control unit 34, it is certainly possible for the ABS unit to be provided according to other arrangements and to be connected to other devices within the vehicle. ABS unit 74 can be a separate or stand-alone electronic module or it can be integrated into another module, device and/or system, as shown in FIG. 1. ABS unit 74 is not limited to one specific embodiment or arrangement, as skilled artisans will recognize other options.

Electronic stability control (ESC) unit 76 may work with torque control unit 34 when it detects certain instability events, such as those pertaining to steering. During normal driving, ESC unit 76 may continuously monitor vehicle dynamics, like steering and vehicle direction, and operate in the background without much intervention that is noticeable to the driver. For example, the ESC unit may compare the driver's intended direction (e.g., that obtained from a steering wheel sensor) to the actual direction of the vehicle, and then take one of a number of corrective measures to improve the stability of the vehicle. Such measures may include adjustments to steering, suspension, power distribution, power generation, braking, etc. Even though unit 76 is referred to here as an electronic stability (ESC) unit, other modules and systems may be used instead, including those referred to as a vehicle stability assist (VSA), vehicle dynamic control (VDC), electronic stability program (ESP), dynamic stability control (DSC), StabiliTrak, AdvanceTrac, etc.

Traction control system (TCS) unit 78 may work with torque control unit 34 when a loss of traction is detected between one or more of the vehicle wheels and the road. A loss of traction may be due to a variety of conditions and circumstances, including varying road surface conditions (e.g., wet, icy, snowy or gravel strewn roads) and hard maneuvers or aggressive driving (e.g., cornering at high speeds), to name just a few. TCS unit 78 may employ a number of corrective measures in order to counteract such conditions. Such measures may include adjustments to steering, suspension, power distribution, power generation, braking, etc. Even though in this preferred embodiment unit 78 is called a TCS unit, other similar units and systems can be used including an anti-slip regulation (ASR). It should be appreciated that units 74-78 may address conditions and environments on an overall vehicle basis, on an axle-by-axle basis, on a wheel-by-wheel basis, or according to some combination thereof Moreover, torque control unit 34 is not limited to any particular combination of units 74-78, as these exemplary units have only been provided as examples of the types of units or sub-systems that the torque control unit may include or call upon.

Battery 36 may store electrical energy that is used to drive electric motor units 50-56, as well as to meet other electrical needs of the vehicle. According to an exemplary embodiment, battery 36 includes a high-voltage battery pack 86 (e.g., 40V-600V battery pack) and a battery control unit 88. Battery pack 86 may include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 36 should be designed to withstand repeated charge and discharge cycles and may be used in conjunction with other energy storage devices, such as capacitors, super capacitors, inductors, etc. Those skilled in the art will appreciate that battery 36 may be provided according to any number of different embodiments, may be connected in any number of different configurations, and may include any number of different components, like sensors, control units and/or any other suitable components known in the art. Torque control system 12 may further include any number of different components such as chargers, transformers, rectifiers, switching power supplies, filtering means, cooling means, additional sensors, control units and/or any other suitable components known in the art.

Engine 38 may propel the vehicle using conventional internal combustion techniques and/or drive a generator, and may include any suitable type of engine known in the art. Some examples of suitable engines include gasoline, diesel, ethanol, flex-fuel, natural gas, liquefied petroleum gas (LPG), hydrogen, naturally aspirated, turbo-charged, super-charged, rotary, Otto-cycle, Atkins-cycle and Miller-cycle engines, as well as others. According to the specific exemplary embodiment shown here, engine 38 is a small fuel-efficient engine (e.g., a small displacement, turbo-charged four-cylinder engine) that receives fuel from a fuel tank 92 and uses the mechanical output of the engine to turn a generator that is coupled to battery 36. Skilled artisans will appreciate that engine 38 may be provided according to any number of different embodiments, may be connected in any number of different configurations (e.g., the engine could be part of a parallel hybrid system where the engine is mechanically coupled to the vehicle wheels instead of exclusively being used to generate electricity), and may include any number of different components and devices. Because the present method is not tied to any particular type of engine and because of the widespread knowledge in the art concerning such engines, a further explanation of exemplary engine 36 is omitted. It is also possible for vehicle 10 to have a fuel cell stack or some other source of electrical energy generation that is used in lieu of or in addition to an internal combustion engine and/or a battery pack for purposes of vehicle propulsion.

Brake units 40-46 are each located at a vehicle wheel or corner and can generate a braking torque to counteract the forward momentum of vehicle 10. According to one embodiment, each of the brake units 40-46 may include a rotor, caliper, brake pads, brake piston, and may be part of an electro-hydraulic braking (EHB) system, an electro-mechanical braking (EMB) system, or some other type of frictional or non-frictional system. In an EMB system, each brake unit 40-46 may include an electrically driven caliper in place of a hydraulically driven piston. Brake units 40-46 may be controlled together in unison, controlled on an axle-by-axle basis (e.g., front wheels controlled together and rear wheels controlled together), controlled in other groups (e.g., driver side wheels controlled together), controlled on a wheel-by-wheel basis, or controlled according to some other arrangement. The method and system described herein are not limited to use with disk brake systems and could be used with other braking systems and arrangements, including drum brake systems. In another embodiment, regenerative braking torque is created by motor units 50-56 and counteracts the forward momentum of the vehicle through electromagnetically-derived force that acts against the forward rotation of the vehicle wheels and/or other drivetrain components (this process may also charge battery 36). In another embodiment, the vehicle uses a combination of frictional and regenerative braking to control the speed of the vehicle and to generate electrical energy.

Although the exemplary method is described herein in the context of a brake-by-wire system, such as an electro-hydraulic braking (EHB) system or an electro-mechanical braking (EMB) system, it should be appreciated that the method may also be used with any number of other braking systems and is not limited to the disclosed embodiment. For example, the present method may be used with other brake-by-wire and non-brake-by-wire systems, regenerative and non-regenerative braking systems, as well as other brake systems using other types of technologies.

Motor units 50-56 are each located at a vehicle wheel or corner and may use electrical energy stored in battery 36 to propel vehicle 10. Each of the motor units 50-56 may simply include a motor for generating a positive torque (acceleration) or they may include both a motor and a generator (a so-called "mogen") for generating both positive torque (acceleration) and negative torque (braking). Skilled artisans will appreciate that a combined motor/generator can both propel the vehicle and slow the vehicle down through regenerative braking, which also generates electrical energy for charging battery 36. Other motor and/or generator embodiments and arrangements are also possible. For example, the motor and generator could be split and provided as two separate devices, or the motor units could be provided on an axle-basis as opposed to an individual wheel basis (e.g., a first motor unit for wheels of the front axle and a second motor unit for the wheels of the rear axle), to cite a few possibilities. Motor units 50-56 may include AC motors (e.g., a three phase AC induction motor), DC motors, brushed or brushless motors, permanent magnet motors, etc., and may include a variety of components, like cooling features, sensors, control units and/or any other suitable components known in the art.

Torque control system 12 may include more, less or a different combination of elements, components, devices and/or modules than those illustrated and described here, as the present method is not limited to this particular embodiment. For example, the torque control module may include: a charger, an inverter/converter, a hybrid transmission, a power-split device, a gear box, one or more clutches, a flywheel and/or other hybrid drivetrain components; a low-voltage electrical circuit or bus (e.g., standard 12V, 18V or 42V circuits), a high-voltage electrical circuit or bus, an accessory power module (APM), electronic accessories, different electronic modules, a telematics unit, additional electric motors and/or other electronic devices; as well as any other devices that may be found in hybrid and non-hybrid vehicles. Furthermore, the components, devices and/or modules shown in FIG. 1 may be integrated or otherwise combined with other parts of the vehicle, as the illustration in that figure is only meant to generally and schematically illustrate one potential system arrangement.

Figure 2:
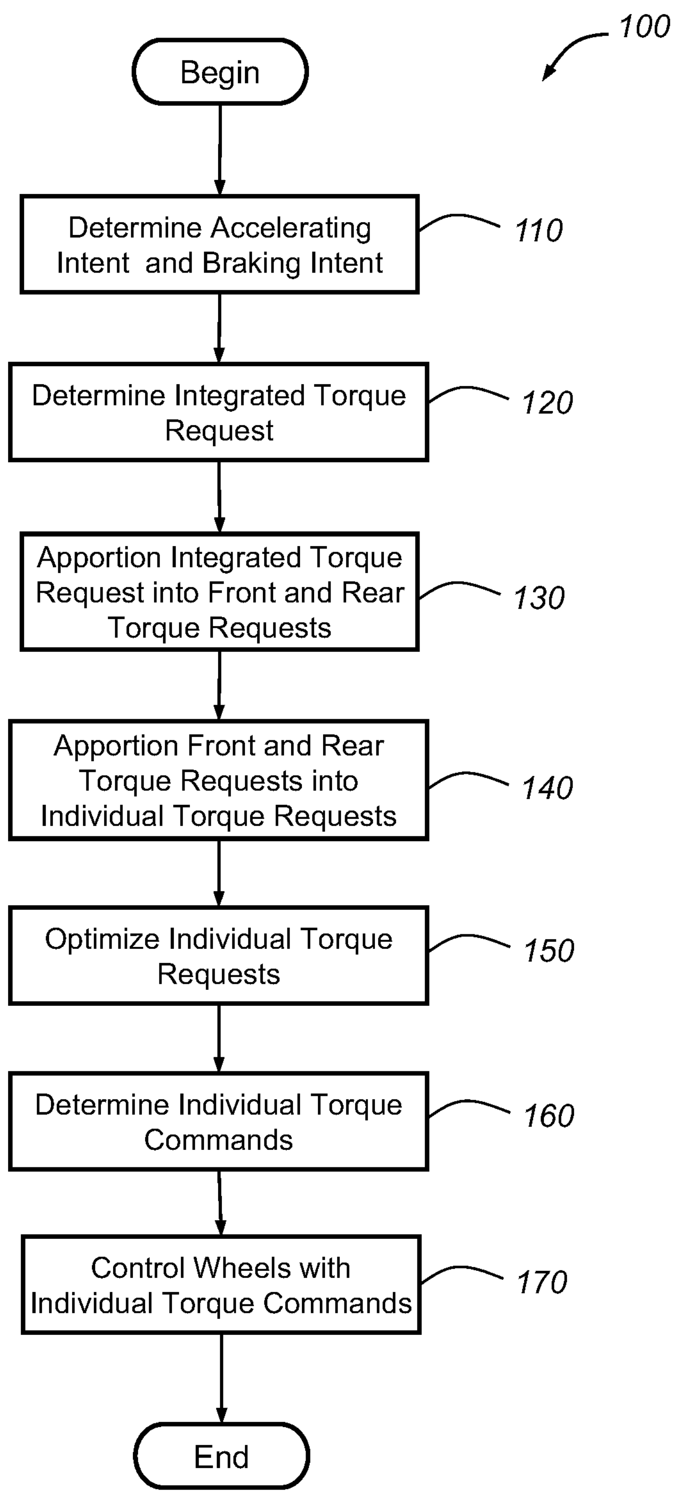
FIG. 2 is a flowchart illustrating an exemplary method for controlling torque at one or more wheels of a vehicle, such as the one shown in FIG. 1.

Turning now to FIG. 2, there is shown an exemplary method 100 for controlling torque at one or more wheels of a vehicle, including controlling both positive torque (acceleration) and negative torque (braking). According to one embodiment, method 100 interprets the acceleration and braking intent of the driver, takes into consideration certain special conditions (e.g., vehicle dynamic conditions), and generates one or more individual torque commands that are sent to individual wheels or corners of the vehicle. The individual torque commands may address certain chassis and powertrain functions like acceleration and braking, and may provide full-feature torque control (i.e., acceleration, braking, vehicle dynamics, etc.) on an individual wheel basis. Thus, the individual torque command sent to one wheel may be different from that sent to another wheel. This differs from many traditional systems where positive torque or acceleration is controlled by an engine control module, negative torque or braking is handled by a brake control module, and vehicle dynamic conditions are addressed by a number of separate modules (e.g., an ABS module, ESC module and TCS module). In such systems, the modules usually operate independently or semi-independently of one another according to an interrupt-style architecture. It is also possible for method 100 to be used in a system where a number of the common chassis, powertrain and/or vehicle dynamic modules have been integrated into a single torque control module or the like.

Beginning with step 110, the method determines the accelerating intent and the braking intent of the driver. This can be accomplished in a number of different ways. For example, step 110 may receive an accelerator signal from accelerator sensor 22 and a brake signal from brake sensor 20, along with any other signals or data that are needed to interpret the driver's accelerating and braking intent. Those skilled in the art will appreciate that any number of different signal processing steps and techniques may be applied to the signals gathered in step 110, including but certainly not limited to, filtering, plausibility checks, redundancy checks, error checks, etc. In one embodiment, the raw sensor readings from sensors 20 and 22 are provided to torque control unit 34 for further processing and analysis, but instead they could be indirectly provided to the torque control unit via some other component or piece of hardware. Step 110 may gather other sensor readings and signals in addition to the exemplary ones described here.

Step 120 determines an integrated torque request. According to an exemplary embodiment, step 120 uses the accelerator and brake signals gathered in the previous step to determine an integrated torque request, which is generally representative of the overall torque being requested and takes into account both the accelerating and the braking intent of the driver. If the driver is only engaging the accelerator pedal or is only engaging the brake pedal, which is usually the case, then step 120 generally does not have to perform any arbitration as only one type of torque (positive or negative) is being requested. However, in those situations where the driver is simultaneously engaging both the accelerator and brake pedals, step 120 may arbitrate between these two conflicting requests and generate a single integrated torque request, where the single integrated torque request is assigned a positive sign for an overall accelerating request and a negative sign for an overall braking request. Skilled artisans will appreciate that one of a number of different methods and techniques may be used to perform this arbitration, including techniques that use weighted averages for the accelerator and brake signals. In one example, the brake signal or driver braking intent is given priority over the accelerator signal which is representative of the driver accelerating intent.

Next, step 130 apportions the single integrated torque request into front and rear torque requests. The exact manner of this apportionment or allocation may be impacted by a number of different factors, including the sign or polarity of the integrated torque request, and step 130 is not limited to any one technique. For example, the front and rear axles of the vehicle may be allocated the same amount of torque (i.e., the requested torque is split evenly between front and rear axles), the front axle may be apportioned more torque than the rear axle (e.g., in an aggressive braking environment), or the rear axle may be allocated more torque than the front axle (e.g., in an aggressive accelerating environment). If the integrated torque request from the previous step has a positive sign, then a first look-up table and/or algorithm may be used to determine a proper apportionment or division of torque between front and rear wheels; if the integrated torque request has a negative sign, then a second look-up table and/or algorithm may be used instead. According to an exemplary embodiment, step 130 may utilize a look-up table or a corresponding algorithm that uses the current acceleration of the vehicle as an input, and front and rear torque requests as outputs. Consider the example where the integrated torque request is a positive value (i.e., the driver is requesting an acceleration) and the vehicle is already accelerating at a rate of 1 $m/s^2$. Step 130 may select a first look-up table that corresponds with positive torque requests, use the current vehicle acceleration of 1 $m/s^2$ as an input to the first look-up table, and receive a pair of outputs from the first look-up table that correspond to the front and rear torque requests. The look-up table may output actual torque values, or it may output a factor, multiplier, fraction or other value that is then applied to the integrated torque request to obtain the actual torque values, to cite two possibilities. In either case, front and rear torque requests can be the output of step 130. Although possible, it is not necessary for the front and rear torque requests to exactly add up to the integrated torque request from which they came, as the combined front and rear torque requests may be greater than or less than the integrated torque request. Skilled artisans will appreciate that any number of suitable algorithms or techniques for apportioning or assigning torque between front and rear wheels may be used by step 130.

Step 140 further apportions or breaks up each of the front and rear torque requests into individual torque requests for the right and left sides of the vehicle. Put differently, step 140 may receive two inputs (front and rear torque requests) and produce four outputs (front right and left torque requests, and rear right and left torque requests). The exact manner of this apportionment or allocation may be impacted by a number of different factors, including input from units 74-78, and step 140 is not limited to any one technique. According to one embodiment, step 140 looks to see if any special vehicle dynamic conditions exist like wheel slip, over- or under-steer, locked brakes, etc. If the vehicle is not currently experiencing any special or exceptional vehicle dynamic conditions (i.e., normal operation), then step 140 may apportion each of the front and rear torque requests evenly between the right and left sides of the vehicle. For example, if none of the ABS unit 74, the ESC unit 76 or the TCS unit 78 report special vehicle dynamic conditions that require changes in torque distribution, then step 140 may simply apportion the front and rear torque requests evenly such that the front right and left torque requests are the same, and the rear right and left torque requests are the same. If, however, special vehicle dynamic conditions are detected, then step 140 may change the apportionment or allocation of torque between the front and rear wheels and/or the left and right wheels in order to address such conditions. For instance, if ESC unit 76 indicates that there is an over-steer or under-steer condition, then step 140 may disproportionately allocate or adjust the requested torque between the front and rear axles and/or the left and right sides of the vehicle in order to address this situation. In most cases, this step assigns an individual torque request to each wheel or corner of the vehicle.

Other factors, limitations and constraints may also affect the apportionment or allocation of torque in steps 130 and/or 140. For example, there may be limits on the amount of positive torque that can be applied to each wheel and/or each axle because of the physical constraints or capabilities of some of the components involved (e.g., each motor unit and/or axle may have a maximum torque limit). The total amount of power that is available from battery 36 to the various motor units may also limit the amount of positive torque that can be applied to each wheel and/or axle. Conversely, if battery 36 is fully or nearly fully charged, then there may be limits regarding negative torque requests that involve regenerative braking. Some of the constraints and limitations considered by steps 130 and/or 140 are "per-axle" constraints and some are "per-wheel" constraints. It is also possible for step 140 to perform some sort of torque vectoring where signals are received from yaw rate sensor 60, lateral acceleration sensor 62, longitudinal sensor 64 and/or the various vehicle speed sensors 26-32. Skilled artisans will appreciate different torque vectoring techniques. These and other inputs may be taken into account when determining an appropriate torque distribution in the vehicle.

Next, step 150 optimizes the individual torque requests assigned to each wheel, and may do so according to a number of different embodiments. As mentioned above, there may be some special conditions that temporarily affect the apportionment or distribution of torque within the vehicle. Step 150 gives the present method another opportunity for such conditions to have an impact on the torque distribution, and may use a feedback loop to accomplish this. For instance, vehicle dynamics sensor units 74-78 can provide steps 130 and/or 140 with feedback on the current status of the different vehicle dynamic conditions, as described above, in addition to weighing in during step 150. In one embodiment, vehicle dynamics sensor units 74-78 provide feedback to steps 130 and/or 140 in order to affect torque distribution on an "axle-basis," and they provide input to step 150 in order to affect torque distribution on a "wheel-basis." It is possible for steps 130-150 to be designed such that they do not preemptively limit torque before a special vehicle dynamics condition is detected (e.g., wheel slip or over-steer), but rather they correct or adjust the torque once such a condition is detected. Steps 130-150 are not limited only to input from vehicle dynamics sensor units 74-78, as these steps may also receive and consider input and readings from any combination of sensors 20-32 or others and may utilize any suitable feedback or non-feedback structure known in the art. In one possible arrangement, step 150 optimizes the individual torque requests by taking into account optimal regenerative braking and charging schemes.

Consider the example where none of the vehicle dynamics sensor units 74-78 detect any special or exceptional dynamic conditions that warrant adjustment to the torque distribution scheme. In such a case, step 150 may simply pass through the individual torque requests that it received from the previous step without modification. On the other hand, if one or more of the vehicle dynamics sensor units 74-78 do sense such a condition (e.g., a wheel slip event), then TCS unit 78 may provide feedback to step 150 so that torque control unit 34 may process and make corresponding adjustments to one or more of the individual torque requests in order to optimize the torque distribution scheme. These optimized individual torque requests may subsequently be used to produce individual torque commands, as will be explained in greater detail. It is possible for step 150 to make changes or modifications to just one of the individual torque requests or to more than one of the individual torque requests.

It should be appreciated that steps 130-150 may change order, may include additional steps, or may be combined or consolidated into fewer steps. For instance, step 140 that apportions torque to left and right sides of the vehicle could be executed before step 130 which apportions torque to the front and rear of the vehicle. It is also possible for steps 130-150 to generate individual torque requests for only some of the wheels (e.g., front wheels only, rear wheels only, right side wheels only, left side wheels only, etc.), as opposed to generating such requests for all four wheels all of the time.

Step 160 uses the individual torque requests—whether or not they were optimized in step 150—to determine individual torque commands which can then be sent to the different wheels or corners of the vehicle. Those skilled in the art will appreciate that it may be necessary to convert the individual torque requests (which may be expressed in units of torque, as unitless values, etc.) into individual torque commands that can actually be sent to actuators like brake units 40-46 or motor units 50-56 and can cause them to operate accordingly. For example, brake units 40-46 may include electronic calipers that require command signals to be formatted in a certain way. Thus, step 160 may convert or translate individual torque requests that have a negative sign (braking request) into properly formatted individual torque commands that can then be sent to one or more of the brake units 40-46. Likewise, step 160 may convert individual torque requests that are positive (accelerating requests) into individual torque commands that are properly formatted for use with motor units 50-56. The sign or polarity of the individual torque requests may affect the conversion process in step 160, as brake units 40-46 and motor units 50-56 may require command signals formatted in different ways. The exact nature and manner in which this conversion takes place can vary, as step 160 is not limited to any one technique, protocol, format, etc.

The phrase "using the integrated torque request to determine one or more individual torque command(s)," as used herein, broadly includes all of the different embodiments mentioned above, as well as any other suitable method that directly or indirectly uses an integrated torque request somewhere in the calculation, creation or determination of an individual torque command. To illustrate, exemplary method 100 "uses the integrated torque request to determine individual torque commands" by: first, apportioning the integrated torque request into front and rear torque requests (step 130); then, apportioning the front and rear torque requests into four separate individual torque requests (step 140); optimizing the four individual torque requests to account for certain vehicle dynamic conditions (step 150); before converting the individual torque requests into individual torque commands that can be sent to brake units 40-46 and/or motor units 50-56 (step 160). However, it is not necessary or required for the present method to use this four-part process, as the method could "use the integrated torque request to determine the individual torque commands" in other ways. For instance, one or more of the intervening steps 130-160 could be omitted or combined together, additional steps could be inserted into the process, or the integrated torque request determined in step 120 could be directly used to determine one or more individual torque commands, to cite several possibilities. Accordingly, the integrated torque request may be used directly or indirectly in the determination of the individual torque commands.

Looking back at steps 130-160, the various processes, calculations, evaluations, determinations, etc. used in these steps may be performed within a single torque control unit 34. More specifically, some of the electronic instructions for carrying out these steps may reside in electronic memory device 70 or elsewhere in torque control unit 34, and the hardware for executing such electronic instructions may be electronic processing device 72 or some other component within the torque control unit. This type of integrated or simplified architecture is somewhat different from traditionally designed vehicles where the various vehicle dynamics sensor units and systems are separate and independent of a central processing unit or module. In some traditionally designed vehicles, the different vehicle dynamics sensor units (e.g., ABS units, ESC units, TCS units, etc.) operate on an interrupt-type of basis where they temporarily take over control of certain aspects of the torque distribution within the vehicle when certain special dynamic conditions take place (e.g., locked brakes, over- or under-steer, wheel slip, etc.), as opposed to providing input to a centralized torque control unit which integrates such input and takes it into account before providing an overall torque command Lastly, step 170 controls one or more wheel(s) of the vehicle with the individual torque command(s). In one embodiment, step 170 controls the four wheels or corners of vehicle 10 with four separate individual torque commands, but this is not necessary. It is possible to control all four wheels with fewer than four individual torque commands (e.g., one, two or three command signals), or to control fewer than four wheels (e.g., in the case of a positive-signed torque request and a non-drive wheel). Torque control unit 34 may send one or more individual torque commands to actuators or other components associated with brake units 40-46 and/or motor units 50-56 such that they apply a negative torque to their associated wheels and slow down the vehicle using frictional and/or regenerative braking, or torque control unit 34 may send one or more individual torque commands to actuators or other components associated with motor units 50-56 such that they apply a positive torque to their associated wheels and accelerate the vehicle. Of course, it is not necessary that the present method be used with a vehicle having four wheels, as it could be used with motorcycles, all-terrain vehicles, as well as any other non-four wheeled vehicle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps in the exemplary method is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for controlling torque at one or more wheels of a vehicle, comprising the steps of:

(a) receiving an accelerator signal from an accelerator sensor and receiving a brake signal from a brake sensor;

(b) using the accelerator signal and the brake signal to determine an integrated torque request, the integrated torque request takes into account both an accelerating intent and a braking intent of the driver;

(c) using the integrated torque request to determine one or more individual torque command(s), each of the individual torque command(s) takes into account both the accelerating intent and the braking intent of the driver; and (d) controlling one or more wheel(s) of the vehicle with the individual torque command(s), wherein each of the individual torque command(s) can cause the controlled wheel to accelerate, to brake, or to maintain a constant speed.

2. The method of claim 1, wherein if the driver simultaneously engages both the accelerator pedal and the brake pedal, then step (b) further comprises arbitrating between the accelerator signal and the brake signal to determine a single integrated torque request, and assigning the single integrated torque request a first sign for an accelerating request and a second sign for a braking request.

3. The method of claim 2, wherein step (b) further comprises arbitrating between the accelerator signal and the brake signal using a weighted average technique that gives priority to the brake signal over the accelerator signal.

4. The method of claim 1, wherein step (c) further comprises apportioning the integrated torque request into front and rear torque requests that each corresponds to a separate axle of the vehicle, and using the front and rear torque requests to determine the individual torque command(s).

5. The method of claim 4, wherein step (c) further comprises using a look-up table to apportion the integrated torque request into front and rear torque requests, and the look-up table uses a current acceleration of the vehicle as an input.

6. The method of claim 5, wherein a first look-up table is used when the integrated torque request has a first sign and a second look-up table is used when the integrated torque request has a second sign.

7. The method of claim 4, wherein step (c) further comprises apportioning the front and rear torque requests into individual torque requests that each corresponds to a separate wheel of the vehicle, and using the individual torque requests to determine the individual torque command(s).

8. The method of claim 7, wherein step (c) further comprises using input from one or more vehicle dynamics sensor unit(s) to apportion the front and rear torque requests into the individual torque requests, and the vehicle dynamics sensor unit(s) include at least one unit selected from the group consisting of: an antilock braking system (ABS) unit, an electronic stability control (ESC) unit, or a traction control system (TCS) unit.

9. The method of claim 8, wherein if none of the vehicle dynamics sensor unit(s) report special vehicle dynamic conditions that require changes to the torque distribution within the vehicle, then step (c) further comprises apportioning the front and rear torque requests evenly across right and left sides of the vehicle.

10. The method of claim 8, wherein if one or more of the vehicle dynamics sensor unit(s) report special vehicle dynamic conditions that require changes to the torque distribution within the vehicle, then step (c) further comprises apportioning the front and rear torque requests disproportionately across right and left sides of the vehicle.

11. The method of claim 7, wherein step (c) further comprises using one or more per-axle constraints or per-wheel constraints to apportion the front and rear torque requests into the individual torque requests.

12. The method of claim 7, wherein step (c) further comprises optimizing the individual torque requests by using feedback from one or more vehicle dynamics sensor unit(s) to make changes to the torque distribution within the vehicle, and using the optimized individual torque requests to determine the individual torque command(s).

13. The method of claim 7, wherein step (c) further comprises converting the individual torque requests into a format that is acceptable for one or more brake units and/or motor units, and using the converted individual torque requests as the individual torque command(s).

14. The method of claim 1, wherein step (d) further comprises controlling a plurality of wheels with a plurality of individual torque commands, each of the individual torque commands: i) is separately determined, ii) is sent from a torque control unit to a separate wheel of the vehicle, and iii) can cause the controlled wheel to accelerate, to brake, or to maintain a constant speed.

15. A method for controlling torque at one or more wheels of a vehicle, comprising the steps of:

(a) determining an integrated torque request, the integrated torque request takes into account both an accelerating intent and a braking intent of the driver;

(b) using the integrated torque request to determine a plurality of individual torque commands, each of the individual torque commands corresponds to a separate wheel of the vehicle and is specifically intended for that separate wheel;

(c) sending each of the plurality of individual torque commands from a torque control unit to a separate wheel of the vehicle; and (d) separately controlling each of the wheels of the vehicle with an individual torque command.

* * * * *